United States Patent [19]

Tamler et al.

[11] Patent Number: 4,821,544

[45] Date of Patent: Apr. 18, 1989

[54] METHOD AND APPARATUS FOR ROLL GAP MEASUREMENT AND CONTROL

[75] Inventors: Horst Tamler, Witten; Wilhelm Tappe, Dortmund; Hermann-Josef Kopineck, Dortmund, all of Fed. Rep. of Germany

[73] Assignee: Hoesch Stahl Aktiengesellschaft, Dortmund, Fed. Rep. of Germany

[21] Appl. No.: 59,607

[22] Filed: Jun. 5, 1987

[30] Foreign Application Priority Data

Jun. 10, 1986 [DE] Fed. Rep. of Germany ....... 3619412

[51] Int. Cl.⁴ .................. B21B 31/34; B21B 37/08; G01B 11/14
[52] U.S. Cl. .......................................... 72/16; 72/21; 72/35; 72/37
[58] Field of Search .............. 72/16, 8, 35, 37, 21; 356/373, 375, 384–387; 358/101, 107

[56] References Cited

U.S. PATENT DOCUMENTS

| | | |
|---|---|---|
| 4,139,890 | 2/1979 | Yerkes et al. ............... 72/37 X |
| 4,287,402 | 9/1981 | Hentschel et al. ............ 72/16 X |
| 4,527,243 | 7/1985 | Loose ....................... 72/11 X |
| 4,535,614 | 8/1985 | Oka ........................ 72/16 |
| 4,548,503 | 10/1985 | Liesch et al. ............... 72/35 X |

Primary Examiner—Lowell A. Larson
Assistant Examiner—Steven B. Katz
Attorney, Agent, or Firm—Thomas S. Baker, Jr.

[57] ABSTRACT

In the method and the apparatus for measuring and controlling the roll gap in a roll stand the roll gap is illuminated by a light source transversely of the roll axis or also parallel to the roll axis. A camera, in particular a CCD line camera, is aligned with its optical system with the roll gap and the illuminated part of the gap is broken down in this camera in the direction of the height or thickness of the gap into image points which generate on illumination an electrical charge, the image points being consecutively periodically interrogated for bright-dark information by drive electronics and the sum of the bright or dark light points serving as information on the magnitude of the roll gap and for controlling the roll gap setting.

7 Claims, 3 Drawing Sheets

METHOD AND APPARATUS FOR ROLL GAP MEASUREMENT AND CONTROL

BACKGROUND

The invention relates to a method and an apparatus for contactless roll gap measurement and control with the aid of light beams.

Hitherto the roll gap has been determined only indirectly with the aid of measuring means which were attached to the mountings, e.g. the support rollers. The values were corrected in accordance with the frame springing of the roll stand which could be determined from the measurement of the rolling pressure by strain gages. The determination of the roll gap by this method was inaccurate.

Hitherto a direct and more accurate measurement at the roll gap was not possible in particular in hot-rolling mills due to the high temperature and the dirt.

German patent application No. 2,404,763 discloses a measuring device which measures the gap between the necks or journals of the working rolls and which can be pivoted out of the gap to enable the rolls to be changed without obstruction. In accordance with the electromagnetical measuring system of German patent application No. 2,404,763 the roll gap can be determined only in cold-rolling mills with adequate accuracy because the device is greatly influenced by temperature fluctuations caused for example by glowing rolled material in hot-rolling mills. A further disadvantage of this known device resides in that its measurement range is only very small. It thus cannot be used in reversible stands as are usual in roughing rolling trains in hot-rolling mills.

In such roughing rolling trains the setting of the rolling gap changes for example within 80 sec. 3 times, the rolling gap varying in magnitude for example from 125 mm to 60 mm.

It is the problem underlying the present invention to provide a measuring method and an apparatus with which extremely accurate and reliable determinations of the rolling gap are possible even in roughing or cogging trains for hot-rolling mills with a very large measuring range.

SUMMARY OF THE INVENTION

"An apparatus for measuring and controlling the rolled gap formed between a pair of rolls mounted in bearing pedestals of a roll stand for a mill having a neck formed at one end of each roll, a reference disk mounted at one end of each roll adjacent the neck and rotatable therewith wherein the disks are coaxial and aligned vertically, a gap formed between each of the reference disks, means for eliminating the gap, a camera mounted to receive light rays representing the thickness of the gap, photosensitive sensors in the camera adapted to respond to receipt of light rays representing the thickness of the gap, electronic drive means for periodically interrogating the photosensitive sensors to drive a length signal representative of the thickness of the gap, and means for outputting a length signal representing the thickness of the gap".

DESCRIPTION OF THE PREFERRED EMBODIMENT

Figure 2:
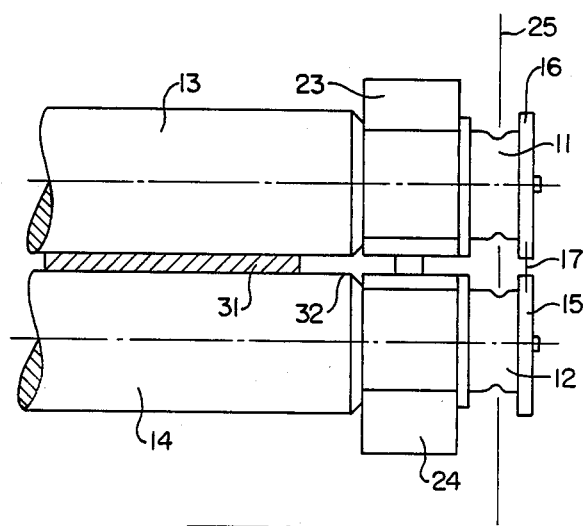
FIG. 2 shows the working rolls with reference to disks.
Figure 3:
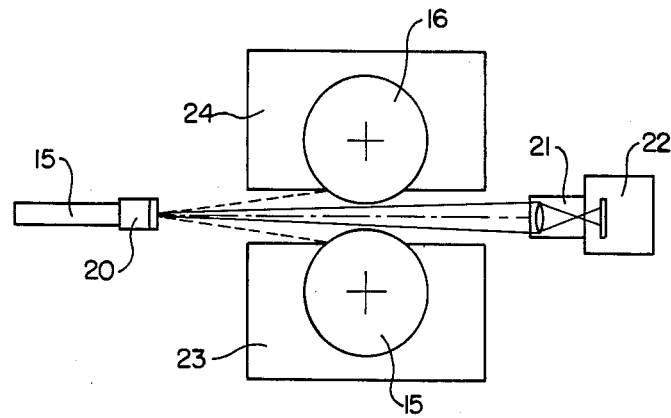
FIG. 3 shows an arrangement for the transmitted beam method with later and line optical system.
Figure 4:
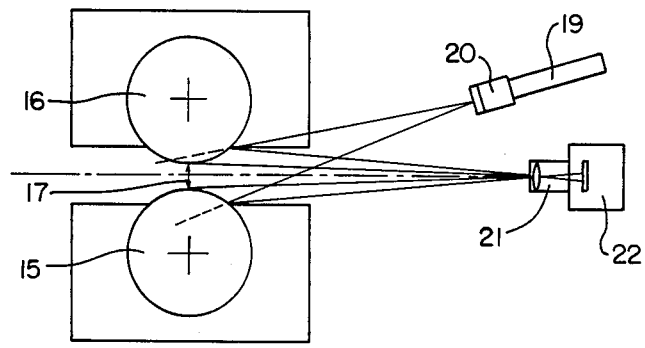
FIGS. 4 and 5 show an arrangement by the incident light method.
Figure 5:
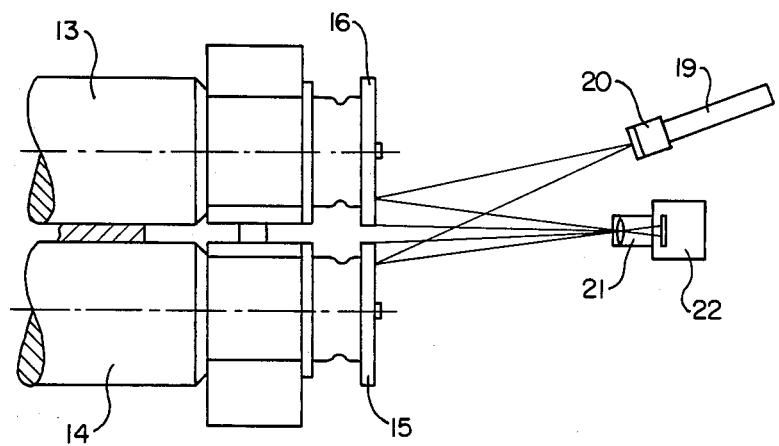

In roll stands in hot-rolling trains or their roughing or cogging trains due to the disturbing water and scales it is not possible to measure the roll gap directly at the edge of the working rolls. For this reason on the somewhat protected necks 11 and 12 of the working rolls 13 and 14 the reference disks 15 and 16 are concentrically attached. The reference disks 15 and 16 form the gap 17 to be measured. The gap 17 is illuminated by the tubular fluorescent lamp 18 or by the laser 19 with line optical system 20. The rays passing through the gap 17 impinge on the objective lens 21 of the CCD line camera 22. The tubular fluorescent lamp 18 or the laser 19 and the CCD line camera 22 are mounted on the frame of the roll stand and far enough apart to permit a change of the working rolls 13 and 14 without removing said parts. The tubular fluorescent lamp 18 or the laser 19 and the CCD line camera 22 are largely protected from splash water and dirt by the bearing pedestals 23 and 24. It is however also possible to provide an additional splash wall 25 illustrated in FIG. 2. In the incident light method shown in FIGS. 4 and 5 it is advantageous for the reference disks 15 and 16 to be sprayed with a bright paint to permit the greatest possible contrast with the dark gap 17.

In the transmitted beam method the gap 17 is imaged in the CCD line camera 22 as bright line which merges at its beginning and end abruptly into dark unilluminated areas. In the incident light method this is exactly the converse.

Figure 1:
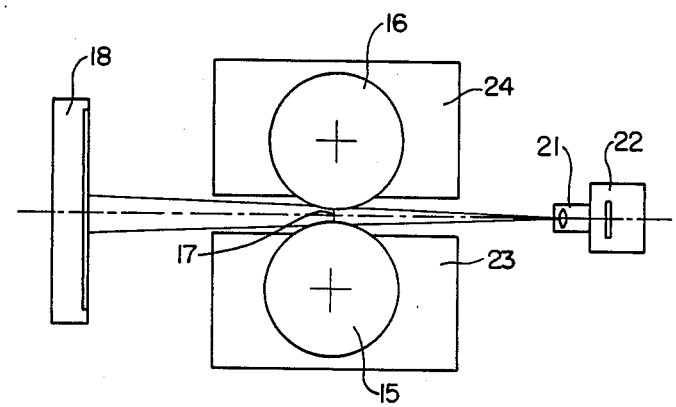
FIG. 1 shows an arrangement for the transmitted beam method with tubular fluorescent lamp.

The execution of a measurement will be explained in detail in particular with reference to the example of FIG. 1. The light beams are emitted approximately parallel from the tubular fluorescent lamp 18 to the gap 17. The light beams incident through the gap are projected by the objective lens 21 onto the diode line sensor of the CCD line camera 22. The objective lens reduces the beam of the gap for example in a ratio of 1 : 10 so that a narrow upright light strip corresponding to the height of the gap 17 is imaged on the diode line sensor which corresponding to the demagnification of the objective lens 21 is only 1/10 of the height of the actual gap 17.

Figure 6:
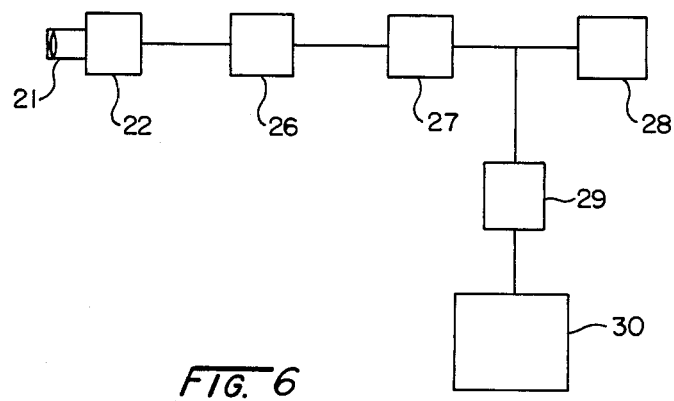
FIG. 6 is a basic circuit diagram of the evaluation means.

This light strip illuminates the small photodiodes lined up vertically in a row on the diode line sensor. There are about 2000 miniaturized photodiodes to a row having a length of about 20 mm. These small photodiodes or photosensitive elements are periodically and consecutively activated by the drive electronics designated by 26 in FIG. 6 and the bright or dark information is interrogated. In the counting means 27 the number of consecutive photosensitive elements in the row which is illuminated is counted. If for example 1000 photosensitive elements are illuminated they have a length of 10 mm. Because of the 1 : 10 demagnification optical system the roll gap then has a thickness of 100 mm.

In the brightness/darkness interrogation only values lying above a predetermined threshold value are counted as bright so that smaller interference signals due to scattered light from for example reflections or diffractions of the rays are suppressed.

The size of the gap is displayed to the operator in the display device 28 or additionally introduced into a comparator 29 where it is compared with a predetermined desired value of the roll gap. A possibly resulting difference is supplied as input signal to the control means 30 for the roll setting system so that an automatic very accurate regulation of the predetermined roll gap is obtained.

If the reference disks 15 and 16 have exactly the same diameter as the working rolls 13 and 14 and on grinding of the working rolls are also ground, their gap is identical to the roll gap. It is however also possible to use reference disks of smaller diameter and it is then necessary to deduct from the value obtained of the gap of the reference disks a value which results when the roll gap is made zero by bringing the working rolls into engagement with each other.

The procedure is exactly the same when the light beam to be measured is passed between the roll necks. Reference disks are also not necessary in hot-rolling mills if for example the necks 11 and 12 project further out of the bearing pedestals 23 and 24.

In cold-rolling mills a measurement is also possible directly adjacent the workpiece 31 at the edge 32.

The advantage of the invention resides in particular also in that a very large measuring range can be measured very accurately with a single camera. The measuring range can of course be still further widened by combining two cameras. With a corresponding evaluation means it is also possible to illuminate only the edge regions of the gap and the region lying in the centre with respect to the height of the gap can remain unilluminated or disregarded in the evaluation.

To avoid damage on changing the rolls it is advantageous for the reference disks to be secured to the end faces of the necks in a manner such that they can be easily unscrewed. The invention can also be carried out with invisible light, for example infrared light.

We claim:

1. An apparatus for measuring and controlling the roll gap formed between a pair of rolls mounted in bearing pedestals of a roll stand for a mill comprising:
   a neck formed at one end of each roll;
   a reference disk mounted at one end of each roll adjacent said neck and rotatable therewith wherein said disks are coaxial and aligned vertically;
   a gap formed between each of the reference disks;
   means for illuminating said gap;
   a camera having an objective lens and mounted to receive light rays representing the thickness of said gap;
   photosensitive sensors in said camera adapted to respond to receipt of light rays representing the thickness of said gap; electronic drive means for periodically interrogating said photosensitive sensors to derive a length signal representative of the thickness of said gap; and
   means for outputting a length signal representing said thickness of said gap.

2. The apparatus of claim 1 in which said illumination means and said camera are aligned with said gap and are mounted on opposite sides of said roll stand.

3. The apparatus of claim 1 in which said illumination means and said camera are mounted on the same side of said roll stand.

4. The apparatus of claim 1 in which said illumination means is a laser with a preceding line optical system.

5. The apparatus of claim 1 in which said camera is a CCD line camera.

6. The apparatus of claim 1 in which said photosensitive sensors comprises a plurality of vertically aligned photodiodes.

7. The apparatus of claim 6 in which said outputting means includes a counting means for counting the number of photodiodes which are activated by receipt of said light rays.

* * * * *